United States Patent
Kato et al.

(10) Patent No.: US 8,597,764 B2
(45) Date of Patent: Dec. 3, 2013

(54) CERAMIC COMPOSITE

(75) Inventors: Hideki Kato, Ogaki (JP); Masahiro Yasuda, Ogaki (JP)

(73) Assignee: Ibiden Co., Ltd., Ogaki-shi (JP)

( * ) Notice: Subject to any disclaimer, the term of this patent is extended or adjusted under 35 U.S.C. 154(b) by 838 days.

(21) Appl. No.: 12/507,025

(22) Filed: Jul. 21, 2009

(65) Prior Publication Data

US 2010/0021684 A1    Jan. 28, 2010

(30) Foreign Application Priority Data

Jul. 25, 2008 (JP) .................................. 2008-192440

(51) Int. Cl.
*B32B 3/24* (2006.01)

(52) U.S. Cl.
USPC ........... 428/139; 428/114; 428/113; 428/408; 428/161; 428/172

(58) Field of Classification Search
USPC .................. 428/139, 114, 408, 113, 161, 172
See application file for complete search history.

(56) References Cited

U.S. PATENT DOCUMENTS

| 6,858,282 B2 * | 2/2005 | Temme .......................... 428/131 |
| 2008/0199681 A1 | 8/2008 | Murphy | |

FOREIGN PATENT DOCUMENTS

| JP | 03-008770 | 1/1991 |
| JP | 5-132384 | 5/1993 |
| JP | 2000-143360 | 5/2000 |
| JP | 2002-68851 | 3/2002 |
| WO | WO 2006/129097 | 12/2006 |

OTHER PUBLICATIONS

Chinese Office Action for corresponding CN Application No. 200910140370.4, Jun. 5, 2012.
Japanese Office Action for corresponding JP Application No. 2008-192440, Jul. 31, 2012.

* cited by examiner

*Primary Examiner* — William P Watkins, III
(74) *Attorney, Agent, or Firm* — Ditthavong Mori & Steiner, P.C.

(57) ABSTRACT

A ceramic composite includes a substrate and a ceramic coating. The substrate includes a carbon fiber-reinforced carbon composite and has a surface on which a plurality of holes are provided. The ceramic coating is provided on the surface of the substrate and inside each of the plurality of holes.

10 Claims, 2 Drawing Sheets

CERAMIC COMPOSITE

CROSS-REFERENCE TO RELATED APPLICATION

This application claims priority under 35 U.S.C. §119 to Japanese Patent Application No. 2008-192440, filed on Jul. 25, 2008, the entire contents of which are incorporated herein by reference.

BACKGROUND OF THE INVENTION

1. Field of the Invention

The present invention relates to a ceramic composite.

2. Description of the Related Art

A C/C composite has outstanding specific strength and specific modulus, and moreover, excellent heat resistance and chemical stability in a high-temperature region exceeding 1,000° C., so that the C/C composite has been widely industrially used, for example, in semiconductor producing equipment and hot press apparatus including aerospace applications. In the meantime, in an industrial material of this kind, a radiation factor and chemical stability (reactivity) are influenced by characteristics of an exposed portion of a surface thereof. The C/C composite is a composite of carbon fibers and a carbon matrix such as glassy carbon, pyrolytic carbon or graphite, so that it becomes difficult to obtain a high purity C/C composite depending on selection of raw materials, so that diffusion of contaminants may occur from a surface thereof.

For the above-mentioned reason, it has been proposed in the C/C composite that a ceramic coating such as a SiC coating or a pyrolytic carbon coating is formed on the surface thereof. The forming of such a coating modifies properties of a surface of a member using the C/C composite to be able to improve exothermic and endothermic characteristics or corrosion resistance. Further, the high-purity gas impermeable ceramic coating formed on the surface can make it possible to reduce or prevent diffusion of impurities contained in the C/C composite.

The ceramic composite used under a high-temperature environment is likely to cause an interlayer peeling phenomenon at an interface with the substrate due to the difference in the coefficient of thermal expansion between the substrate and the ceramic coating formed on a surface thereof while being heated from ordinary temperature to high temperature. For this reason, there has been proposed a conversion method in which a substrate and a surface layer portion form a silicon carbide layer as a continuous tissue to provide a functionally graded material (for example, see JP-A-H5-132384).

Further, it has also been proposed that a paper body obtained by papermaking of carbon fibers is impregnated with pyrolytic carbon by Chemical Vapor Infiltration (CVI), thereby forming a pyrolytic carbon coating (for example, see JP-A-2002-68851).

However, in the above-mentioned SiC coating obtained by the conversion method or the coating obtained by CVI of pyrolytic carbon, the coating effectively acts on interlayer peeling only at the interface between the ceramic coating and the substrate. When the substrate is a C/C composite aligned in two directions parallel to the ceramic coating or a laminated body of a plurality of layers, or when fibers constituting the substrate do not cross each other in a thickness direction, like a nonwoven fabric, the C/C composite can not have sufficient strength against the interlayer peeling in the inside thereof. For this reason, the interlayer peeling phenomenon sometimes occurs in the inside of the C/C composite by internal stress generated by the difference in thermal expansion between the ceramic coating and the C/C composite. A main cause for this is that a carbon fiber layer in the vicinity of a surface layer of the C/C composite expands and contracts following the ceramic coating, but the adhering force of the ceramic coating does not act on a deep layer distant from the surface layer (the inside of the C/C composite layer).

SUMMARY OF THE INVENTION

According to one aspect of the present invention, a ceramic composite includes a substrate and a ceramic coating. The substrate includes a carbon fiber-reinforced carbon composite and has a surface on which a plurality of holes are provided. The ceramic coating is provided on the surface of the substrate and inside each of the plurality of holes.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

Exemplary embodiments of a ceramic composite according the present invention will be described below with reference to the accompanying drawings.

Figure 1:
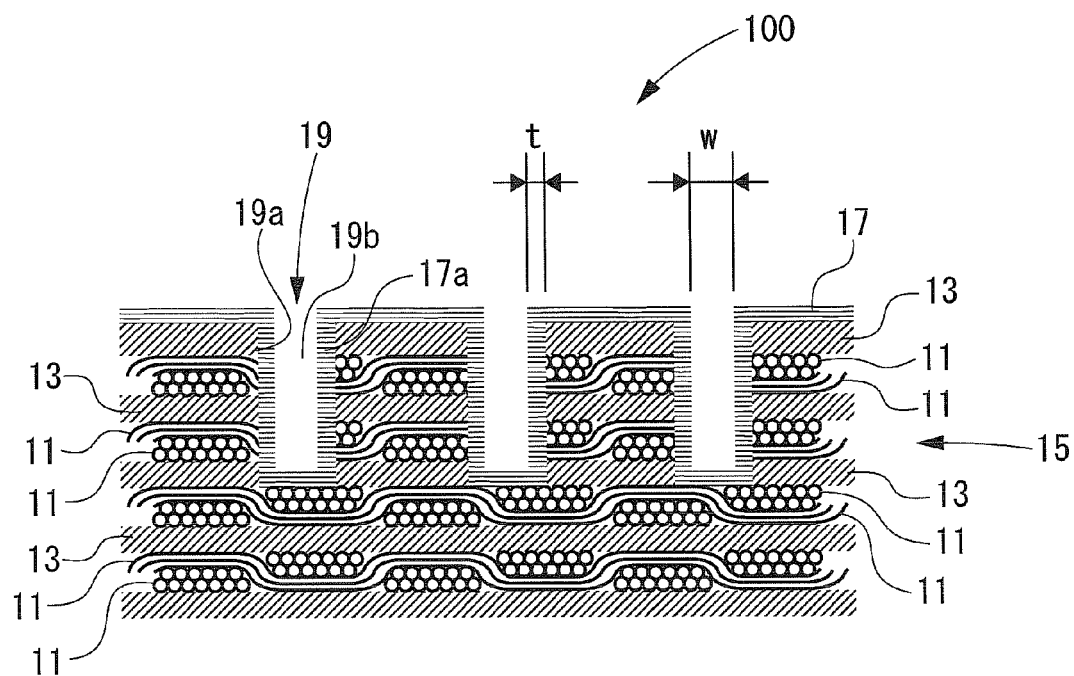
FIG. 1 is a cross-sectional view showing a ceramic composite according to an embodiment of the present invention.

FIG. 1 is a cross-sectional view showing a ceramic composite according to an embodiment of the present invention.

The ceramic composite 100 according to an embodiment of the present invention includes a substrate 15, and a ceramic coating 17 which coats a surface of the substrate 15. The substrate 15 includes carbon fibers 11 and a carbon matrix 13 filled in interstices between the carbon fibers 11.

The substrate 15 including the carbon fibers 11 and the carbon matrix 13 filled in the interstices between the carbon fibers 11 means a carbon fiber-reinforced carbon composite (C/C composite). The carbon fibers 11 constituting a part of the carbon fiber-reinforced carbon composite may be arranged by filament winding, papermaking, or in a woven fabric or the like to reinforce it. In FIGS. 1 to 4, the carbon fibers 11 are present as both warp (represented by lines) and weft (represented by circles) fibers.

The woven fabric may also include a three-dimensional woven fabric having vertical yarns in a thickness direction, as well as planar (warp and weft) fibers such as those in a plain woven fabric, a twill fabric and a triaxial woven fabric. However, in the ceramic composite 100 according to this embodiment, the C/C composite as the substrate 15 having the carbon fibers 11 formed by the plain woven fabric, the twill fabric or the triaxial woven fabric having substantially no vertical yarns (substantially free from vertical yarns), papermaking, a nonwoven fabric or filament winding particularly exerts its effect, because peeling strength in the thickness direction in the ceramic composite having no vertical yarns can not be sufficiently secured.

A precursor of the carbon matrix 13 filled in the interstices between the carbon fibers 11 may be any, as long as it can form a carbonaceous or graphitic matrix by burning. As the matrix precursor carbonized or graphitized by burning, there can be used pitch obtained from petroleum, coal or the like, as well as a thermosetting resin having a high carbonization yield such as a COPNA resin, a phenol resin, a furan resin or a polyimide resin. Further, the matrix can also be formed by chemical vapor infiltration (CVI) of pyrolytic carbon, SiC or the like.

A plurality of holes 19 are formed in the substrate 15, and internal surfaces 19*a* of the holes 19 are covered (coated) with the ceramic coating 17. The ceramic coating 17*a*, which covers the internal surfaces 19*a* of the holes 19, acts as a mechanical interlayer bonding body and has a resistant effect against peeling between the substrate layers. The ceramic coating 17*a* formed on the internal surfaces 19*a* of the holes 19 acts as an anchor to have a function of preventing peeling. That is, peeling strength is increased. The peeling strength is proportional to shear strength at adhesion surfaces between the ceramic coating 17*a* and the internal surface 19*a* of the holes 19.

When the substrate 15 has a constitution in which the carbon fibers 11 and the carbon matrix 13 are laminated in a plurality of layers, the holes 19 pass through at least the outermost layer of the carbon fibers 11. This increases peeling strength between the ceramic coating 17 and at least the outermost layer of the carbon fibers 11. Further, the holes pass through the outermost layer of the carbon fibers 11, whereby the ceramic coating 17 adheres to the layer of the carbon fibers 11 second from the outermost layer at bottom portions of the holes 19 to also increase peeling strength between the outermost layer and the second layer of the carbon fibers 11.

The ceramic coating 17 may be any, as long as it has heat resistance and can be coated on the C/C composite. For example, there can be utilized pyrolytic carbon, SiC, BN, TaC, AlN or the like. It is advantageous to use the C/C composite and the ceramic coating 17 each having an equivalent level of the coefficient of thermal expansion. However, in some kinds of ceramics to be coated, the coefficient of thermal expansion equivalent to that of the C/C composite can not be selected in some cases.

In such a case, there is a fear that the difference in thermal expansion between the substrate 15 and the ceramic coating 17 causes peeling of the ceramic coating 17 or peeling at a laminated portion of the substrate 15. Compared to this, in the ceramic composite 100 according to this embodiment, the ceramic coating 17 acts as an anchor at an interface between the ceramic coating 17 and the substrate 15 and at the laminated portion of the substrate 15, thereby being able to reduce or prevent peeling. In particular, even when the interface between the ceramic coating 17 and the substrate 15 is formed as a functionally graded material, whereby peeling becomes less likely to occur at the above-mentioned interface portion, peeling in the inside of the substrate 15, which occurs due to warpage generated by the difference in thermal expansion between the ceramic coating 17 and the substrate 15, can be reduced or prevented by an anchor action.

Figure 2:
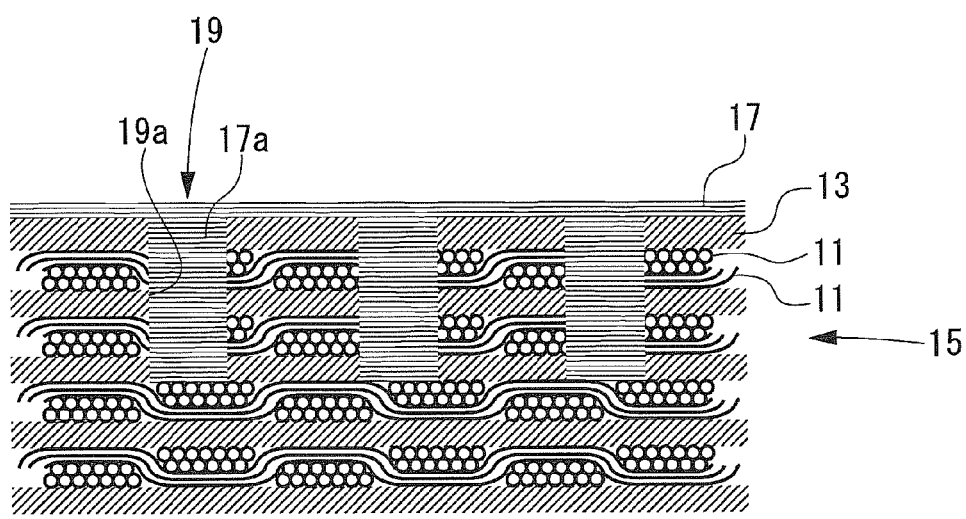
FIG. 2 is a cross-sectional view showing a modified embodiment in which holes are filled with a ceramic.

FIG. 2 is a cross-sectional view showing a modified embodiment in which the holes are filled with the ceramic.

The holes 19 after forming of the ceramic coating 17 may either be sealed as shown in FIG. 2 or remain as holes 19*b* as shown in FIG. 1. In such a structure that the holes 19 are filled with the ceramic 17*a* which forms the ceramic coating 17, as shown in FIG. 2, the filled ceramic 17*a* configures a solid axis shape to increase compression-tensile strength in an axis line direction and shear strength in a direction vertical to the axis line, compared to the case where the ceramic 17*a* which covers the internal surfaces 19*a* of the holes 19 has a hollow pipe-like structure, as shown in FIG. 1.

On the other hand, in the structure shown in FIG. 1, in which the holes 19 after the formation of the ceramic coating 17 remain as the holes 19*b*, the width W of opening portions of the holes 19*b* is preferably twice or less the thickness t of the ceramic coating 17*a*. A decrease in effectiveness of adhesive strength of the ceramic coating 17*a* due to an excessive increase in width W of the opening portions of the holes 19*b*, compared to the thickness t of the ceramic coating 17*a*, can be reduced or prevented. That is, the thickness t of the ceramic coating 17*a* with which the internal surfaces 19*a* of the holes 19 are covered is secured thicker than the radius of the hollow holes 19*b* which remain after the formation of the coating, and strength of the ceramic coating 17 as the mechanical interlayer bonding body is effectively secured.

The plurality of holes 19 are formed vertically from the surface of the substrate 15. Since the holes are vertical, the holes can be easily formed, for example, by cutting with a cutting tool or perforation before curing and burning of the C/C composite. Moreover, the internal surfaces 19*a* of the holes 19 can be easily covered with the ceramic coating 17*a*.

The plurality of holes 19 may be formed either entire surface of the ceramic composite 100 or only in the vicinity of an exposed end portion of a laminated surface of the C/C composite. Further, the plurality of holes 19 may be formed entire surface of the ceramic composite 100 and formed at higher density in the vicinity of the end portion. This is because a thermal expansion strain which occurs by the formation of the ceramic coating 17 is likely to concentrate on the vicinity of the end portion, and particularly, peeling of the substrate 15 is likely to occur at the vicinity of the end portion. In other words, when the depths d of the holes 19 are not uniform, the peeling stress is distributed across multiple layers and therefore, less likely to occur than if the holes have the same depth where peeling stress is concentrated on only one layer.

Figure 3:
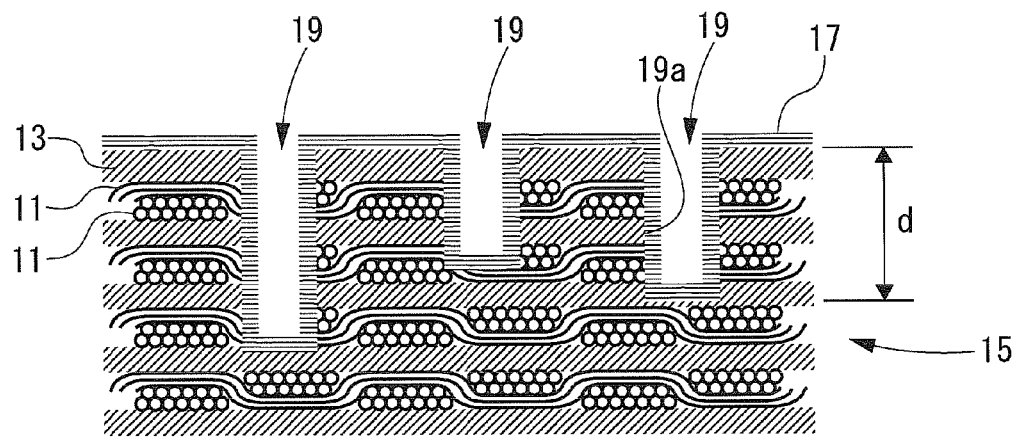
FIG. 3 is a cross-sectional view showing a modified embodiment in which holes having different depth are formed.

FIG. 3 is a cross-sectional view showing another modified embodiment in which the holes having different depth are formed.

The depths d of the holes 19 may be all the same or may very (not be uniform). When the depths d are the same, stress concentration is likely to occur at a layer of the deepest portions of the holes 19, resulting in the easy occurrence of peeling in the vicinity of the deepest portions of the holes 19. However, when the depths d vary, the stress concentration becomes not likely to occur, and therefore, peeling becomes not likely to occur. That is, when the depths d of the holes 19 are not uniform, weak portions do not occur at which bonding force comes not to act between the specific layers when the depth of the holes is constant.

For the holes 19, it is advantageous that each of the holes 19 has a circular shape at at least the opening portions. In this case, the holes can be easily made using a drill or a laser beam processing machine. Further, peeling strength becomes equal in any radial directions at equal distances from the axis line of each hole 19. Compared to the case where square holes or the like are formed, no difference in peeling strength occurs in any radial directions from the axis line, and a strain caused by stress concentration becomes not likely to occur in the substrate 15.

Figure 4:
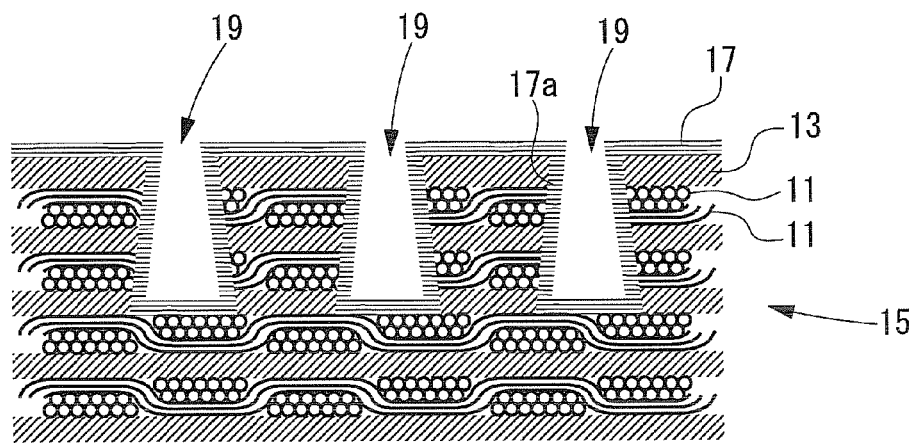
FIG. 4 is a cross-sectional view showing a modified embodiment in which holes are formed in a cone shape.

FIG. 4 is a cross-sectional view showing still another embodiment in which the holes are formed in a cone shape.

The holes 19 may have a cone shape which is expanded inwardly from the opening portions, as shown in FIG. 4. In other words, the cone shape has an opening portion smaller than a deepest portion in size. In this embodiment, the holes are formed, for example, in a truncated cone shape. The cone-shaped ceramic 17a continuous with the ceramic coating 17 formed on the surface of the substrate 15 is buried in the substrate 15 as an anchor which can not be pulled out, thereby further increasing interlayer peeling strength.

Furthermore, although not shown, the holes 19 may pass through the substrate 15 entirely. When the holes 19 are formed passing through the substrate 15, the ceramic 17a is formed passing through the substrate 15 from the front to the back thereof. Accordingly, not only the ceramic 17a increases shear strength at adhesion surfaces in the holes, but also holding force for sandwiching the substrate 15 from the front and back sides thereof contributes to improvement in peeling strength. In such a pass-through structure, the ceramic coating 17 is formed on the front and back surfaces of the substrate 15, and the ceramic coating 17 formed on the internal surfaces 19a of the holes 19 is continuous at both ends thereof with the ceramic coating 17 on the front and back of the substrate, thereby being able to form a strong joined structure in which the substrate 15 is sandwiched from the front and back thereof.

Hereinafter, the method for producing the ceramic composite 100 will be can be described.

[Substrate]

As a substrate 15, any C/C composite can be utilized, as long as it is a commercially available C/C composite. A plurality of holes 19 may be formed by mechanically on the commercially available C/C composite after curing and burning or may be formed before curing and burning. In the case in which the holes are formed after curing and burning, the holes can be formed in any manner such as mechanical way using a drill or the like, or laser processing or the like.

In the case in which holes are formed before curing and burning, the holes are easily formed with a needle or the like without using the drill or the laser processing machine. When formed before curing, the C/C composite is softened so that the holes 19 would disappear. Accordingly, the holes 19 may be formed, for example, by using organic needles made of a resin, wood, paper or the like, and cured and burned without pulling out them. When the organic needles are used, the needles are carbonized or decomposed while largely contracting in the burning process even in the truncated cone-shaped holes 19, thereby being able to be easily removed.

[Coating]

The formation of the ceramic coating 17 can be performed by known methods. For example, in the case of pyrolytic carbon coating, the C/C composite prepared in the above-mentioned process is placed in a CVD furnace, and heated at 1,300 to 2,000° C. A hydrocarbon gas which acts as a raw material, such as propane, and a carrier gas such as hydrogen are allowed to flow in the furnace to form a coating on a surface thereof. Incidentally, the raw material gas diffuses in the furnace, so that it can infiltrate into the plurality of holes formed on the surface of the C/C composite. Accordingly, the ceramic coating 17 can be formed on the internal surfaces 19a of the holes 19.

In the case of SiC coating, the C/C composite prepared in the above-mentioned process is placed in a CVD furnace, and heated at 1,100 to 1,500° C. Trichloromethylsilane as a raw material gas and hydrogen as a carrier gas are allowed to flow in the furnace to be able to form a coating on a surface thereof. Incidentally, the raw material gas diffuses in the furnace, so that it can infiltrate into the plurality of holes 19 formed on the surface of the C/C composite. Accordingly, the ceramic coating 17 can be easily formed on the internal surfaces 19a of the holes 19.

Further, in the case of the SiC coating, it may be formed by using a CVR method, not the CVD method. By the CVR method, peeling between the coating and substrate 15 is less likely to occur since a functionally graded interface is formed. According to the CVR method, the above-mentioned C/C composite is placed in a reaction furnace on a bottom portion of which a generation source including Si powder or a mixture of SiC powder and $SiO_2$ powder has been placed, followed by heating at 1,600 to 2,300° C., thereby being able to obtain the SiC coating.

Therefore, according to the ceramic composite 100 having the above-mentioned constitution, the plurality of holes 19 are formed on the surface of the substrate 15, and the internal surfaces 19a of the holes 19 are covered with the ceramic coating 17. Accordingly, even when peeling strength can not be sufficiently secured, such as when the C/C composite acting as the substrate 15 is the body aligned in two directions parallel to the ceramic coating 17 or the laminated body or when the fibers do not cross each other in the thickness direction, as seen in a nonwoven fabric, the ceramic coating 17 which covers the internal surfaces 19a of the holes 19 acts as the mechanical interlayer bonding body to bind the substrate 15 in a laminated direction, thereby being able to increase peeling strength. As a result, there can be reduced or prevented peeling of the inside of the substrate, which occurs due to a thermal expansion strain caused by coating of the ceramic coating 17.

Figure 5:
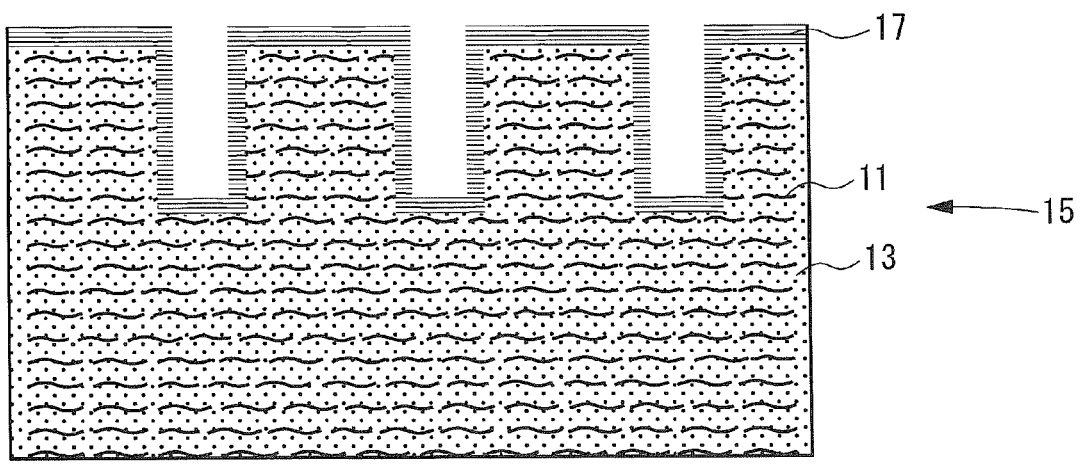
FIG. 5 is a cross-sectional view showing a ceramic composite according to an embodiment of the present invention.

In the above-described respective embodiments, the carbon fibers 11 constituting a part of the substrate 15 have been shown in a woven fabric form in which warp yarns and weft yarns cross each other in the drawings. However, in the ceramic composite 100 according to an embodiment of the present invention, the carbon fibers 11 constituting the substrate 15 may be a nonwoven fabric or the like in which they do not cross each other in a thickness direction, as shown in FIG. 5 or as has already been described.

An embodiment of the present invention provides a ceramic composite which can reduce or prevent interlayer peeling in the inside of the C/C composite, which occurs due to the difference in thermal expansion from the ceramic coating, even when peeling strength can not be sufficiently secured, such as when the C/C composite on which the ceramic coating substrate is to be formed is a body aligned in two directions or the laminated body or when the carbon fibers forming the C/C composite are the nonwoven fabric.

(1) According to an embodiment of the present invention provides a ceramic composite including: a substrate including a carbon fiber-reinforced carbon composite; and a ceramic coating formed on a surface of the substrate, wherein a plurality of holes are formed on the surface of the substrate, and internal surfaces of the holes are covered with the ceramic coating.

According to this ceramic composite, the ceramic coating which covers the internal surfaces of the holes acts as a mechanical interlayer bonding body to exhibit resistant effect against peeling between the substrate layers. That is, peeling strength is increased. Incidentally, peeling strength is proportional to shear strength at adhesion surface between the ceramic coating and the internal surface of the holes.

(2) In the ceramic composite of (1), the holes may be filled with a ceramic which forms the ceramic coating.

According to this ceramic composite, the filled ceramic configures a solid axis shape to increase compression-tensile strength in an axis line direction and shear strength in a direction vertical to the axis line, compared to the case where the ceramic with which the internal surfaces of the holes are covered has a hollow pipe-like structure.

(3) In the ceramic composite of (1), a width of the majority of opening portions of the holes after covered with the ceramic coating may be twice or less than a thickness of the ceramic coating. Preferably, more than 80%, more than 90%, more than 95% or all of the opening portions are twice or less than the thickness of the ceramic coating.

According to this ceramic composite, a decrease in effectiveness of adhesive strength of the ceramic coating due to an excessive increase in width of the openings of the holes, compared to the thickness of the ceramic coating, can be reduced or prevented. That is, the thickness of the ceramic coating with which the internal surfaces of the holes are covered is secured thicker than the radius of the hollow holes which remain after the formation of the coating, and strength of the ceramic coating as the mechanical interlayer bonding body is effectively secured.

(4) In the ceramic composite of any one of (1) to (3), the substrate may include a plural carbon fiber layers and a plurality of carbon matrix layers laminated.

(5) In the ceramic composite of (4), the holes may pass through at least the outermost carbon fiber layer.

According to this ceramic composite, peeling strength between the ceramic coating and at least the outermost carbon fiber layer is increased. Further, the holes pass through the outermost carbon fiber layer, whereby the ceramic coating adheres to the carbon fiber layer second from the outermost layer at bottom portions of the holes to also increase peeling strength between the outermost layer and the second carbon fiber layer. In other words, according to this ceramic composite, the peeling stress is distributed across multiple layers and therefore peeling is less likely to occur than if all holes have uniform depth and where peeling stress is concentrated on only one layer.

(6) In the ceramic composite of any one of (1) to (5), the depths of the holes may be not uniform.

According to this ceramic composite, weak portions do not occur at which bonding force comes not to act between the specific layers when the depth of the holes is constant.

(7) In the ceramic composite of any one of (1) to (6), each of the holes may have a circular shape at at least an opening portion thereof.

According to this ceramic composite, the holes can be easily formed using a drill or a laser beam processing machine. Peeling strength becomes equal in any radial directions at equal distances from the axis line of the hole. Compared to the case where square holes or the like are formed, no difference in peeling strength occurs in any directions from the axis line, and a strain caused by stress concentration is not likely to occur in the substrate.

(8) In the ceramic composite of any one of (1) to (7), each of the holes may have a cone shape which is expanded inwardly from an opening portion thereof.

According to this ceramic composite, the cone-shaped ceramic coating is continuous with the ceramic coating formed on the surface of the substrate and is buried in the substrate as an anchor, thereby further increasing interlayer peeling strength.

(9) In the ceramic composite of any one of (1) to (8), the holes may pass through the substrate.

According to this ceramic composite, the ceramic coating is formed passing through the substrate from the front to the back thereof. Accordingly, not only the ceramic increases shear strength at adhesion surfaces in the holes, but also holding force for sandwiching the substrate from the front and back sides thereof contributes to improvement in peeling strength.

(10) In the ceramic composite of any one of (1) to (9), the carbon fiber-reinforced carbon composite may include carbon fibers and a carbon matrix filled in interstices between the carbon fibers.

(11) In the ceramic composite of any one of (1) to (10), the carbon fiber-reinforced carbon composite may be substantially free from vertical yarns. Free from vertical yarns means less than 1%, preferably less than 0.5%, more preferably less than 0.1% and most preferably none of the yarns are in the vertical direction.

According to the embodiment of the ceramic composite, the plurality of holes are formed on the surface of the substrate, and the internal surfaces of the holes are covered with the ceramic coating. Accordingly, even when peeling strength can not be sufficiently secured, such as when the C/C composite acting as the substrate is the body aligned in two directions parallel to the ceramic coating or the laminated body or when the fibers do not cross each other in the thickness direction, as seen in a nonwoven fabric, the ceramic with which the internal surfaces of the holes are covered acts as the mechanical interlayer bonding body to bind the substrate in a laminated direction, thereby increasing peeling strength and being able to prevent peeling of the inside of the substrate, which occurs due to a thermal expansion strain caused by coating of the ceramic coating.

Obviously, numerous modifications and variations of the present invention are possible in light of the above teachings. It is therefore to be understood that within the scope of the appended claims, the invention may be practiced otherwise than as specifically described herein.

What is claimed is:
1. A ceramic composite comprising:
   a substrate comprising a carbon fiber-reinforced carbon composite and having a surface on which a plurality of holes are provided; and
   a ceramic coating provided on the surface of the substrate and inside each of the plurality of holes,
   wherein the ceramic coating covers an inside of each of the plurality of holes to define an opening width thereof, the opening width is less than twice a thickness of the ceramic coating provided inside each of the plurality of holes.
2. The ceramic composite according to claim 1, wherein the substrate comprises a plurality of carbon fiber layers and a plurality of carbon matrix layers, each of the plurality of carbon fiber layers and each the plurality of carbon matrix layers being laminated on one another.
3. The ceramic composite according to claim 2, wherein the plurality of carbon fiber layers comprises an outermost carbon fiber layer through which at least one of the plurality of holes penetrates.
4. The ceramic composite according to claim 1, wherein the plurality of holes has a first depth and a second depth, the first depth being different from the second depth.
5. The ceramic composite according to claim 1, wherein each of the plurality of holes has an opening having a circular shape.
6. A ceramic composite comprising:
   a substrate comprising a carbon fiber-reinforced carbon composite and having a surface on which a plurality of holes are provided; and
   a ceramic coating provided on the surface of the substrate and inside each of the plurality of holes, wherein each of the plurality of holes has a cone shape having a first diameter at an opening of each hole and a second diameter at a bottom of the each hole, the first diameter being smaller than the second diameter.

7. The ceramic composite according to claim 1, wherein the plurality of holes pass through the substrate.

8. The ceramic composite according to claim 1, wherein the carbon fiber-reinforced carbon composite comprises carbon fibers and a carbon matrix, the carbon matrix being filled in interstices between the carbon fibers.

9. The ceramic composite according to claim 1, wherein the carbon fiber-reinforced carbon composite is substantially free from vertical yarns.

10. The ceramic composite according to claim 1,
wherein the substrate comprises at least one carbon fiber layer and at least one carbon matrix layer, the at least one carbon fiber layer and the at least one carbon matrix layer being laminated on one another, and
wherein the plurality of holes extend in a direction perpendicular to a lamination direction of the at least one carbon fiber layer and the at least one carbon matrix layer.

\* \* \* \* \*